Sept. 29, 1970     C. L. LEBLANC     3,531,190

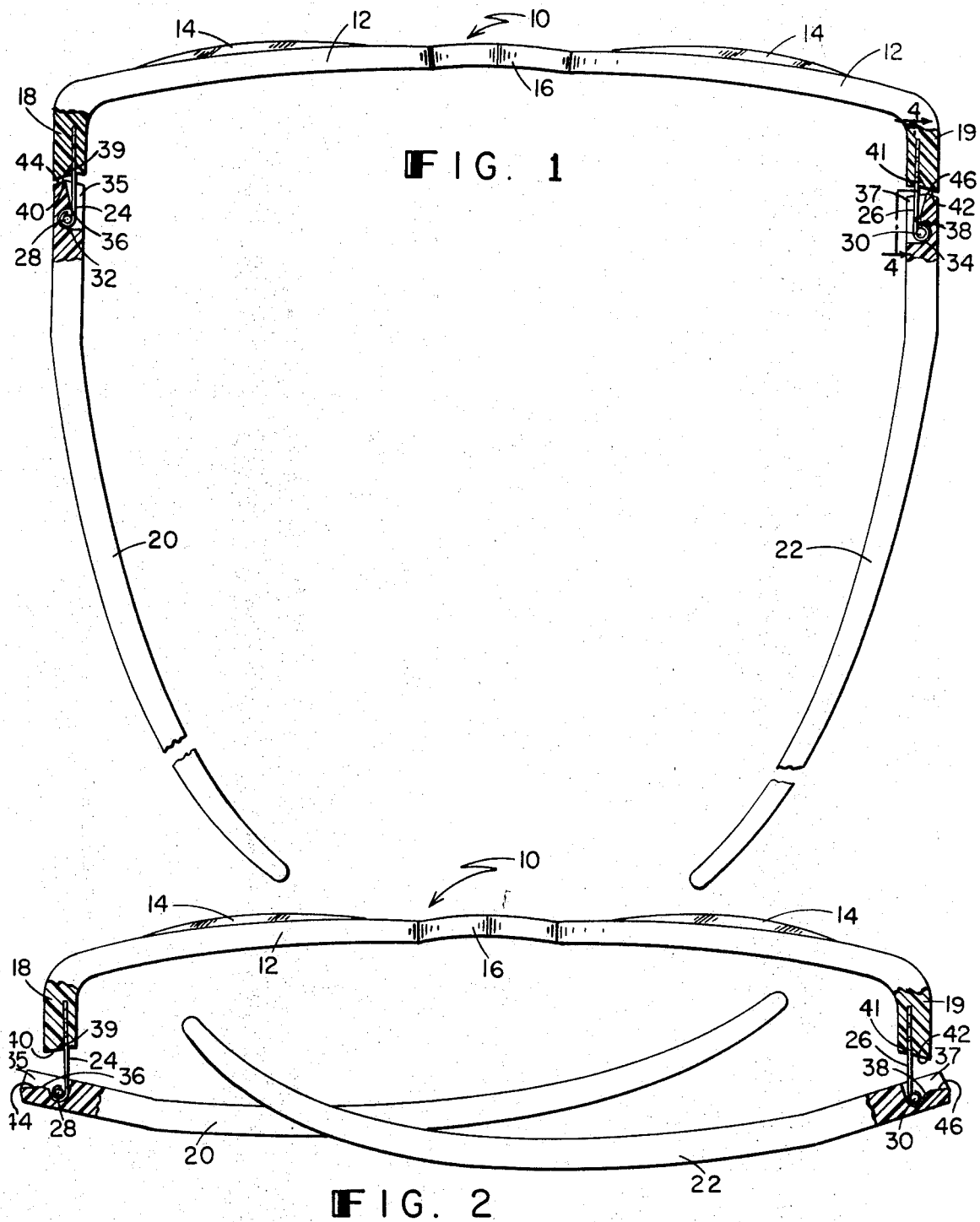

SPECTACLE FRAME ASSEMBLY

Original Filed March 15, 1967     2 Sheets-Sheet 2

INVENTORS.
CONRAD LeBLANC

BY *John F. Stevens*

ATTORNEY.

United States Patent Office 3,531,190
Patented Sept. 29, 1970

3,531,190
SPECTACLE FRAME ASSEMBLY
Conrad L. Leblanc, Leominster, Mass., assignor to Foster Grant Co., Inc., Leominster, Mass., a corporation of Delaware
Continuation of application Ser. No. 623,389, Mar. 15, 1967. This application June 18, 1969, Ser. No. 835,305
Int. Cl. G02c 5/16
U.S. Cl. 351—113                                  1 Claim

ABSTRACT OF THE DISCLOSURE

This disclosure concerns a spectacle frame assembly having means for allowing the temple portions of the frame to conform to a wide range of sizes or distances between the opposed temple portions, and throughout this size range, to be under sufficient tension or tautness to fit snuggly on a wearer's head. This is accomplished by the provision of a special connecting member positioned between the front lens retaining portion and the temple portions. The connecting member includes a hinge or the like which will allow pivotal movement of the temple portion through a predetermined angle relative to the front lens retaining portion, and a resilient, flexible portion which will allow further spreading or outward movement when stressed by pushing the ends of the temple portions outwardly. Adjacent parts of the front lens retaining portion and the temple portions may conveniently be shaped to cooperate, to the fullest extent, with the connecting members.

---

This application is a continuation of application Ser. No. 623,389 filed Mar. 15, 1967.

BACKGROUND OF THE INVENTION

This invention relates generally to spectacle frames, and more particularly to connecting members positioned between the front lens retaining portion and each of the temple portions to permit movement of the temple portions relative to the front lens retaining portion.

Generally, a pair of spectacle frames comprises a front portion having means for holding in position a pair of lens elements. At the outer sides of this front lens retaining portion are places for connecting temple portions or elongated arms which serve to hold the spectacle frame on a wearer's head by the snug engagement of opposite sides thereof. These temple portions normally are pivotally movable from positions in which they are folded into generally overlying positions with the back of the lens retaining portion, to positions in which they extend backward from the lens retaining portion to engage the sides of a wearer's head.

In the past, the temple portions have usually been connected to the front lens retaining portion by means of simple hinges which permitted pivotal movement of the temple portions through a predetermined angle. Generally, the angles of the backwardly extending temple portions are not entirely suited for a particular wearer's head size and adjustment to various extents has been necessary. Needless to say, such adjustment to various sizes, by bending the temple members or otherwise, is difficult to accurately make as the optimum degree of snuggness desired is very hard to attain while maintaining balance or equality of snuggness between the temple members.

SUMMARY

An object of the present invention is to eliminate the above-mentioned problems of size adjustment and balance between the temple portions.

Another object of this invention is to provide a spectacle frame which will be self-adjusting to many different sizes.

Still another object of this invention is to provide a spectacle frame which will maintain the temple portions under a desirable degree of tension so that the spectacles will fit snugly on a wearer's head.

A further object is to provide a spectacle frame in which the tension of the opposite temple portions is automatically balanced.

Pursuant to the above objects, the present invention provides a novel connecting member positioned between the front lens retaining portion and each of the temple portions which allows relatively free angular movement of the temple portions to a predetermined point, i.e., unfolding from positions overlying the back of the front lens retaining portion to positions extending generally backward from the front lens retaining portion, and then further movement in opposite directions spreading them apart under tension. This is accomplished by providing, in the connecting members, a hinge or the like which allows relatively free pivotal movement of the temple portions up to a certain angle, and a flexible, resilient portion in the connecting members for allowing further movement of the temple portions under tension.

BRIEF DESCRIPTION OF THE DRAWINGS

In the drawings:
FIG. 1 is a plan view of a spectacle frame assembly which embodies the invention, showing the temple portions in their normally extended position.
FIG. 2 is a plan view of the invention showing the temple portions in a folded position.

GENERAL DESCRIPTION

Figure 3:
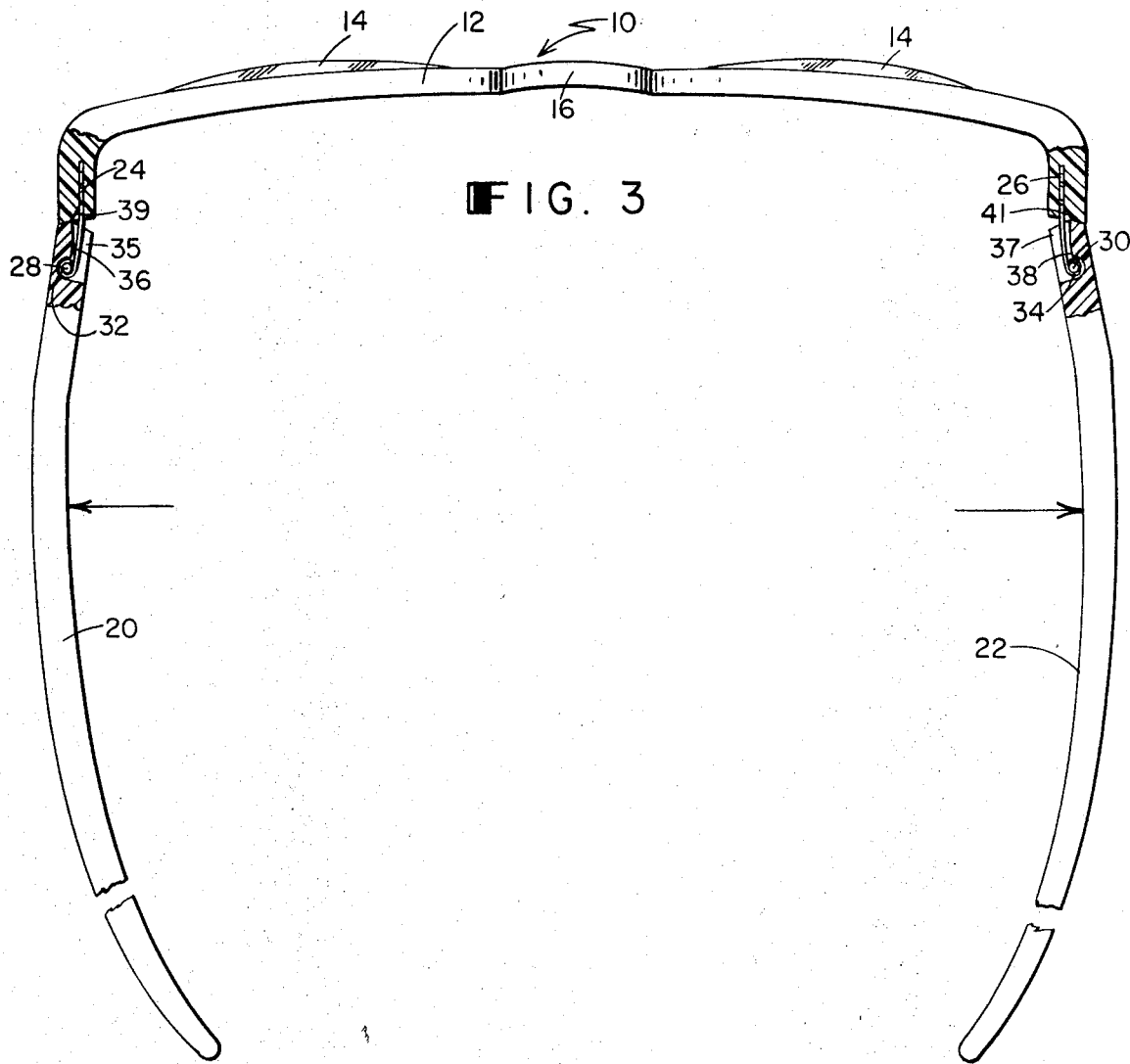
FIG. 3 is a plan view of the invention showing the temple portions in their outermost position.
Figure 4:
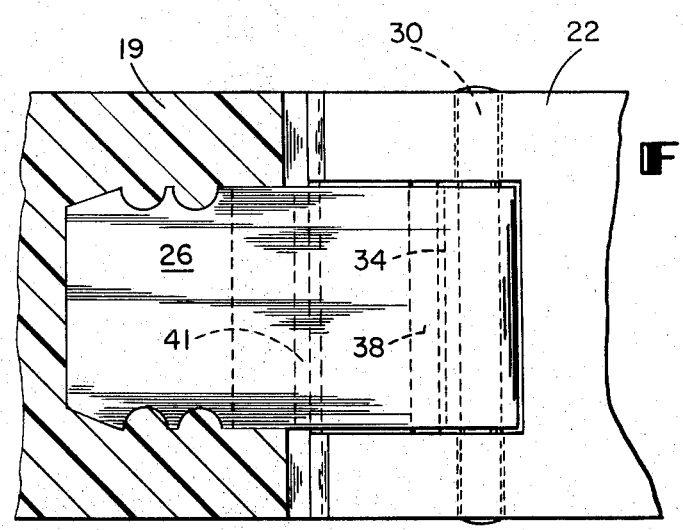
FIG. 4 is a partial section view taken along lines 4—4 of FIG. 1.

Referring specifically to the drawings, 10 indicates generally the spectacle frame assembly according to my invention having a front lens retaining portion 12 which includes lens members 14 and a bridge portion 16 connecting the opposite sides of the lens retaining portion 12. As shown in the drawings, the front lens retaining portion 12 is a wrap-around type having corner portions 18 and 19 generally perpendicular to a plane passing through the lens members 14. It should be understood, however, that the front lens retaining portion of the spectacle frame according to this invention need not be a wrap-around style, but may be any desired configuration, e.g. lying generally in a flat plane with non-rounded corners. The front lens retaining portion 12 may be made of any suitable material such as plastic, metal, etc. To hold the assembly on the wearer's head, there are provided a pair of opposed temple portions 20 and 22 which may be of a material similar to the front lens retaining portion 12. The temple portions 20 and 22 snuggly engage the sides of a wearer's head to hold the spectacle assembly in place. To illustrate the invention more clearly, portions of the corners 18 and 19, as well as parts of the temple portions 20 and 22, have been shown in section in FIGS. 1, 2 and 3.

The temple portions 20 and 22 are assembled with the front lens retaining portion 12 by means connecting members 24 and 26 which are rigidly attached to either the front lens retaining portion 12 or the temple portions 20 and 22. As shown in the drawings, the connecting members 24 and 26 are rigidly attached to the front lens retaining portion 12 at the corners 18 and 19 by, e.g. embedding portions of the connecting members into the corner portions 18 and 19 of the front lens retaining portion 12. Of course, rigid attachment may be accomplished in other ways such as by riveting, for example. The opposed temple portions 20 and 22 are pivotally attached to the other ends of connecting members 24 and 26 respectively. As shown in the drawings, pivotal attachment at these points is accomplished by means of pins 28 and 30 which may extend through the temple portions and are held to the connecting members 24 and 26 by means of ends 32 and 34 which surround the pins 28 and 30 respectively. Although not shown in the drawings, it should be understood that the position of the connecting members 24 and 26 may be reversed, i.e., the fixed ends of the connecting members 24 and 26 may be attached to the temple portions 20 and 22, and the pivotal attachment may be as the corners 18 of the front lens retaining portion 12.

As shown in FIG. 1, the temple portions 20 and 22 are extended to the limit of their pivotal movement about the pins 28 and 30. The outermost pivotal positions are determined by the flattened surfaces 36 and 38 of the temple portions 20 and 22 respectively abutting the connecting members 24 and 26. The temple portions 20 and 22 are free to rotate about the pins 28 and 30 between their extended position as shown in FIG. 1 and the closed positions shown in FIG. 2 in which the temple portions 20 and 22 are generally overlying the back of the lens retaining portion 12 in a folded condition.

FIG. 3 illustrates the manner in which the temple portions 20 and 22 may be resiliently urged, by means of the flexible, resilient connecting members 24 and 26 to positions beyond the extent of the pivotal movement about the pins 28 and 30. This outermost portion of the temple members 20 and 22 is reached by causing the connecting members 24 and 26 to bend or, in other words, stressing the connecting members 24 and 26.

The temple portions 20 and 22 are molded or cut away as shown in the drawings in a particular manner which allows for the free folding and opening of these portions. Temple portions 20 and 22 are provided wtih slots or cutaway central portions 35 and 37 respectively, which allow pivoting of the temple portions 20 and 22 about points coincident with pins 28 and 30 respectively. As shown in the drawings, the corners 18 of the front lens retaining portion 12 are also molded or cut away in a special manner at 39 and 41 such as to allow an appreciable portion of the span of the connecting member 24 and 26 to be free to bend. Thus, the slots or cut-outs 35, 37, 39 and 41 cooperatively provide spaces allowing connecting members 24 and 26 to bend over an appreciable portion of their lengths.

The connecting members 24 and 26 are made of any suitable material such as a flexible material of high strength, e.g. a beryllium-copper alloy in order to provide for much flexing without fracture. Any piece of material such as spring steel may be suitable for the connecting members 24 and 26.

From the foregoing description it will be seen that there has been provided a spectacle frame assembly in which the temple portions 20 and 22 may be extended or diverged outwardly beyond the normal extent of the pivotal movement about pins 32 and 34 under tension. In this manner the temple portions 20 and 22 are readily adjustable to different sizes within certain limits. The outermost extent of the bending is determined by the surfaces 40 and 42 of temple portions 20 and 22 respectively abutting surfaces 44 and 46 of the front lens retaining portion 12. Thus, it is impossible to bend the temple portions 20 and 22 outwardly beyond predetermined limits, thereby preventing breaking or permanent bends in the connecting portions 24 and 26.

It will be understood that various changes in the details, materials, steps and arrangement of parts, which have been herein described and illustrated in order to explain the nature of the invention, may be made by those skilled in the art, within the principle and scope of the invention as expressed in the appended claim.

I claim:

1. A spectacle frame assembly comprising:
  (a) a front lens retaining portion for retaining a pair of lenses substantially in a plane intersecting the line of vision of the wearer;
  (b) a pair of integral corner portions extending rearwardly at the ends of said front lens retaining portion;
  (c) a pair of temple portions connected to said corner portions and extending backward therefrom in a normal open position;
  (d) a pin mounted on each of said temple portions;
  (e) means for connecting each of said temple portions to said corner portions including an elongated strip of spring metal embedded at one end into one of said corner portions, the other end of each of said spring metal strips surrounding one of said pins mounted on said temple portions for pivotal attachment thereto, each of said spring metal strips having between its ends a straight portion which extends between said corner portions and said temple portions and is arranged substantially perpendicular to the plane of the spectacle lenses, said pivotal attachment of said spring metal strips to said pins allowing angular movement of said temple portions from their folded positions generally overlying the back of said front lens retaining portion through angles in which said temple portions extend backward from said front lens retaining portion;
  (f) said substantially straight portion of each of said spring metal strips comprising a means for flexing said temple portion apart beyond the extent of their pivotal movement by freely bending over its entire connecting span between said temple portions and said corner portions, and for biasing said temple portions back toward their normally extended positions when displaced therefrom in a direction further separating said temple portions, providing a flexible but snug fit of said spectacle frame assembly on said wearer.

References Cited

UNITED STATES PATENTS 2,825,266    3/1958    Kleinman.

FOREIGN PATENTS 181,979    5/1955    Austria.
550,843    11/1956    Italy.

DAVID SCHONBERG, Primary Examiner

R. L. SHERMAN, Assistant Examiner